United States Patent
Gomora

(10) Patent No.: US 11,673,555 B2
(45) Date of Patent: Jun. 13, 2023

(54) VEHICLE THREAT DETECTION AND RESPONSE

(71) Applicant: Ford Global Technologies, LLC, Dearborn, MI (US)

(72) Inventor: Arturo Gomora, Zinacantepec (MX)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 616 days.

(21) Appl. No.: 16/530,462

(22) Filed: Aug. 2, 2019

(65) Prior Publication Data

US 2021/0031772 A1 Feb. 4, 2021

(51) Int. Cl.
*B60W 30/165* (2020.01)
*B60W 30/09* (2012.01)
(Continued)

(52) U.S. Cl.
CPC ...... *B60W 30/18163* (2013.01); *B60W 30/09* (2013.01); *B60W 30/0956* (2013.01);
(Continued)

(58) Field of Classification Search
CPC ......... B60W 30/18163; B60W 30/165; B60W 30/09; B60W 30/0956; B60W 2554/80; B60W 2556/65; B60W 2554/4042; B60W 2556/60; B60W 2756/10; B60W 40/105; B60W 10/18; B60W 10/04; B60W 10/20; B60W 10/10; B60W 2520/10; B60W 2710/06; B60W 2710/08; B60W 2710/1005; B60W 2710/18; B60W 2710/20; G08G 1/167; G08G 1/166; G08G 1/0133; G08G 1/04; G08G 1/0112; G06N 20/00; G06N 3/0454; G06K 9/00825; G06Q 50/26; G06Q 50/30; H04W 4/46

See application file for complete search history.

(56) References Cited

U.S. PATENT DOCUMENTS

2006/0273922 A1 12/2006 Bhogal et al.
2007/0103339 A1 5/2007 Maxwell et al.
(Continued)

FOREIGN PATENT DOCUMENTS

| CN | 109416873 A | * | 3/2019 | ............. G06Q 40/08 |
|---|---|---|---|---|
| JP | 4989448 B2 | | 8/2012 | |
| JP | 2016151910 A | | 8/2016 | |

OTHER PUBLICATIONS

English_Translation_CN109416873A (Year: 2016).*
(Continued)

*Primary Examiner* — Peter D Nolan
*Assistant Examiner* — Ashley L Redhead, Jr.
(74) *Attorney, Agent, or Firm* — Frank A. MacKenzie; Bejin Bieneman PLC

(57) ABSTRACT

A method includes, based on comparing a velocity, lane selection and path selection of a target vehicle with respect to a host vehicle, determining a following risk assessment for the target vehicle relative to the host vehicle, determining the target vehicle is following the host vehicle based on the following risk assessment being above a threshold, and then transmitting data identifying the target vehicle to a remote computer and actuating vehicle components to operate the host vehicle to a location specified by the remote computer.

17 Claims, 3 Drawing Sheets

(51) Int. Cl.
   *G06V 20/58*    (2022.01)
   *B60W 30/18*    (2012.01)
   *B60W 30/095*   (2012.01)
   *G08G 1/16*     (2006.01)
   *G06N 20/00*    (2019.01)

(52) U.S. Cl.
   CPC ........... *B60W 30/165* (2013.01); *G06N 20/00* (2019.01); *G06V 20/584* (2022.01); *G08G 1/166* (2013.01); *G08G 1/167* (2013.01); *B60W 2554/80* (2020.02); *B60W 2556/65* (2020.02)

(56) References Cited

U.S. PATENT DOCUMENTS

| | | | | |
|---|---|---|---|---|
| 2013/0057397 | A1* | 3/2013 | Cutler | B62D 15/0255 340/435 |
| 2017/0316533 | A1* | 11/2017 | Goldman-Shenhar | H04L 67/306 |
| 2020/0369266 | A1* | 11/2020 | Yukawa | G08G 1/096741 |
| 2021/0082286 | A1* | 3/2021 | Itou | G08G 1/0104 |
| 2021/0129858 | A1* | 5/2021 | Omasta | B60W 40/09 |

OTHER PUBLICATIONS

Brandon Gregg, "What should you do if you are on foot and suspect someone in a motor vehicle is or has been following you?", (2016) Online. QUORA. Web. https://www.quora.com/What-is-the-best-course-of-action-when-someone-is-following-you-in-a-car-while-you-are-driving (Year: 2016).*

Quora, "What is the best course of action when someone is following you in a car while you are driving?", https://www.quora.com/What-is-the-best-course-of-action-when-someone-is-following-you-in-a-car-while-you-are-driving.

* cited by examiner

VEHICLE THREAT DETECTION AND RESPONSE

BACKGROUND

Vehicles may include a communication system to report an incident such as an accident and/or emergency situation to a remote computer. A response to an incident can depend on timely identification of the incident.

DETAILED DESCRIPTION

Figure 1:
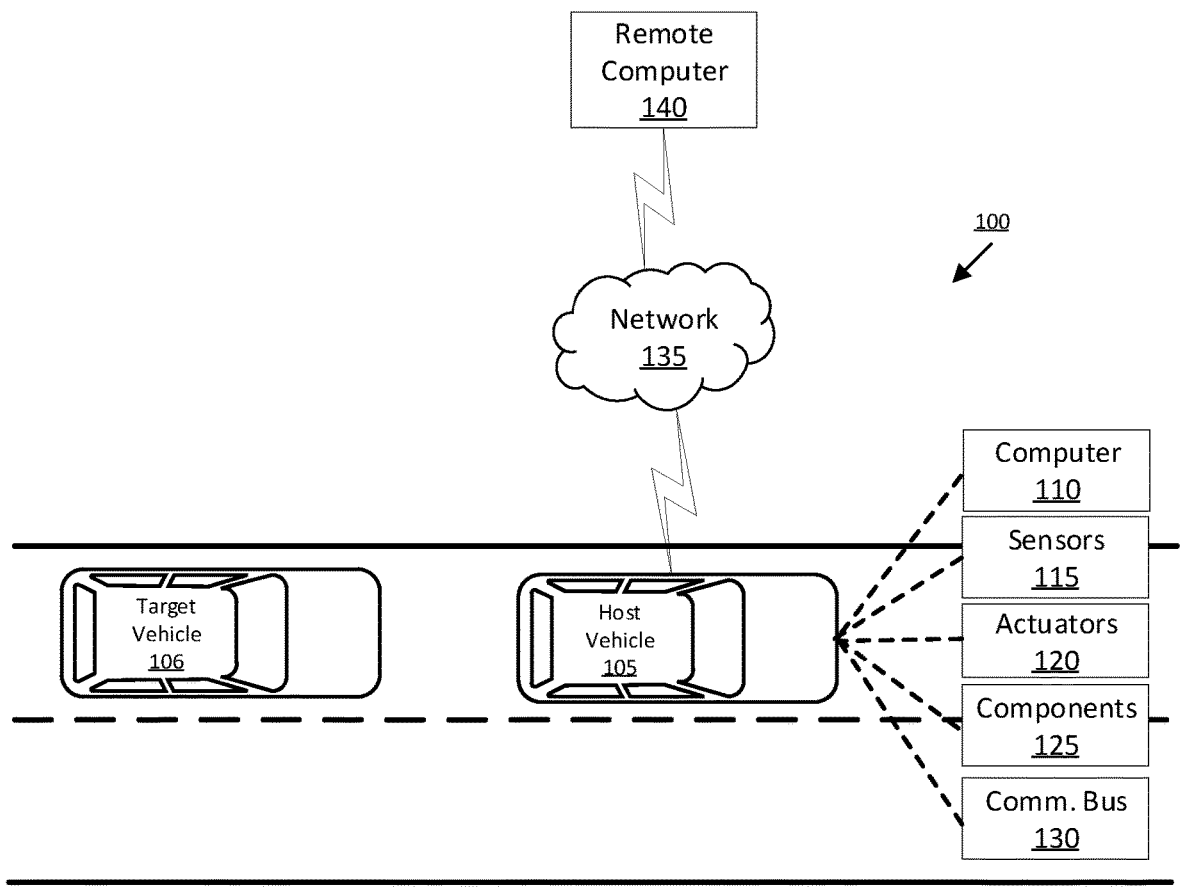
FIG. 1 is block diagram of an exemplary system for detecting and responding to a target vehicle following a host vehicle.

A method includes, based on comparing a velocity, lane selection, and path selection of a target vehicle with respect to a host vehicle, determining a following risk assessment for the target vehicle relative to the host vehicle, determining the target vehicle is following the host vehicle based on the following risk assessment being above a threshold, and then transmitting data identifying the target vehicle to a remote computer and actuating vehicle components to operate the host vehicle to a location specified by the remote computer.

The method can include detecting a distance between the host vehicle and the target vehicle and determining the following risk assessment further based on the distance.

The data identifying the target vehicle can include at least one of image data or video data of the target vehicle.

The remote computer can be one of a portable device, a vehicle computer, or a computer associated with the location.

Determining the following risk assessment can include obtaining the following risk assessment as output from a machine learning program.

The method can include outputting an alert identifying the target vehicle to the host vehicle based on the following risk assessment being above the threshold.

Comparing a velocity can include determining whether a velocity of the target vehicle adapts to a velocity of the host vehicle.

Comparing a lane selection can include determining whether lane selections of the target vehicle correspond to two or more lane selections of the host vehicle.

Comparing a path selection can include determining whether the path selection of the target vehicle corresponds to two or more turns of the host vehicle.

A system includes a computer including a processor and a memory, the memory storing instructions executable by the processor to, based on comparing a velocity, lane selection, and path selection of a target vehicle with respect to a host vehicle, determine a following risk assessment of the target vehicle relative to the host vehicle, determine the target vehicle is following the host vehicle based on the following risk assessment being above a threshold, and then transmit data identifying the target vehicle to a remote computer and actuate vehicle components to operate the host vehicle to a location specified by the remote computer.

The instructions can further include instructions to detect a distance between the host vehicle and the target vehicle and to determine the following risk assessment further based on the distance.

The data identifying the target vehicle can include at least one of image data or video data of the target vehicle.

The remote computer can be one of a portable device, a vehicle computer, or a computer associated with the location.

Determining the following risk assessment can include obtaining the following risk assessment as output from a machine learning program.

The instructions can further include instructions to output an alert identifying the target vehicle to the host vehicle based on the following risk assessment being above the threshold.

Comparing a velocity can include determining whether a velocity of the target vehicle adapts to a velocity of the host vehicle.

Comparing a lane selection can include determining whether lane selections of the target vehicle correspond to two or more lane selections of the host vehicle.

Comparing a path selection can include determining whether the path selection of the target vehicle corresponds to two or more turns of the host vehicle.

Further disclosed herein is a computing device programmed to execute any of the above method steps. Yet further disclosed herein is a computer program product, including a computer readable medium storing instructions executable by a computer processor, to execute an of the above method steps.

FIG. 1 is a block diagram illustrating an example vehicle threat detection system 100, including a vehicle computer 110 programmed to, based on comparing a velocity, lane selection, and path selection of a target vehicle 106 with respect to a host vehicle 105, determine a following risk assessment of the target vehicle 106 relative to the host vehicle 105, i.e., a risk that the target vehicle 106 is following the host vehicle 105, determine the target vehicle 106 is following the host vehicle 105 based on the following risk assessment being above a threshold, and then transmit data identifying the target vehicle 106 to a remote computer 140 and actuate vehicle components 125 to operate the host vehicle 105 to a location specified by the remote computer 140. The vehicle computer 110 may be programmed to monitor respective trajectories of a host vehicle 105 and other nearby vehicles. The vehicle computer 110 may use respective trajectories of the vehicles to determine a threat to the host vehicle 105 and operate the host vehicle 105 to respond to the threat with a threat mitigation action or actions. Advantageously, the vehicle computer 110 can notify a remote computer 140 about a potential threat and operate the host vehicle 105 to a specified location, which allows the host vehicle 105 to receive assistance from another vehicle to mitigate or prevent the potential threat from transpiring. For example, upon determining a target vehicle 106 is following the host vehicle 105, the vehicle computer 110 can report the target vehicle 106 to, e.g., the police, and can operate the host vehicle 105 to, e.g., a police station.

A vehicle 105 includes the vehicle computer 110, sensors 115, actuators 120 to actuate various vehicle components 125, and a vehicle communications bus 130. Via a network 135, the communications bus 130 allows the vehicle computer 110 to communicate with one or more remote computers 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, a human machine interface (HMI), etc. Alternatively, or additionally, in cases where the vehicle computer 110 actually comprises a plurality of devices, the vehicle 105 communication network may be used for communications between devices represented as the vehicle computer 110 in this disclosure. Further, as mentioned below, various controllers and/or sensors 115 may provide data to the vehicle computer 110 via the vehicle 105 communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, 106, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the vehicle computer 110 may be configured for communicating via a vehicle-to-vehicle communication bus 130 with devices outside of the vehicle 105, e.g., through a vehicle-to-vehicle (V2V) or vehicle-to-infrastructure (V2X) wireless communications to another vehicle, and/or to the remote computer 140 (typically via direct radio frequency communications). The communication bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communication bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with the remote computer 140. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 140 can be a conventional computing device, i.e., including one or more processors and one or more memories, programmed to provide operations such as disclosed herein. Further, the remote computer 140 can be accessed via the network 135, e.g., the Internet or some other wide area network. The remote computer 140 can be, e.g., a computer maintained at a physical location, a cloud-based server, a remote vehicle computer, a portable device, e.g., a mobile phone, etc.

Figure 2:
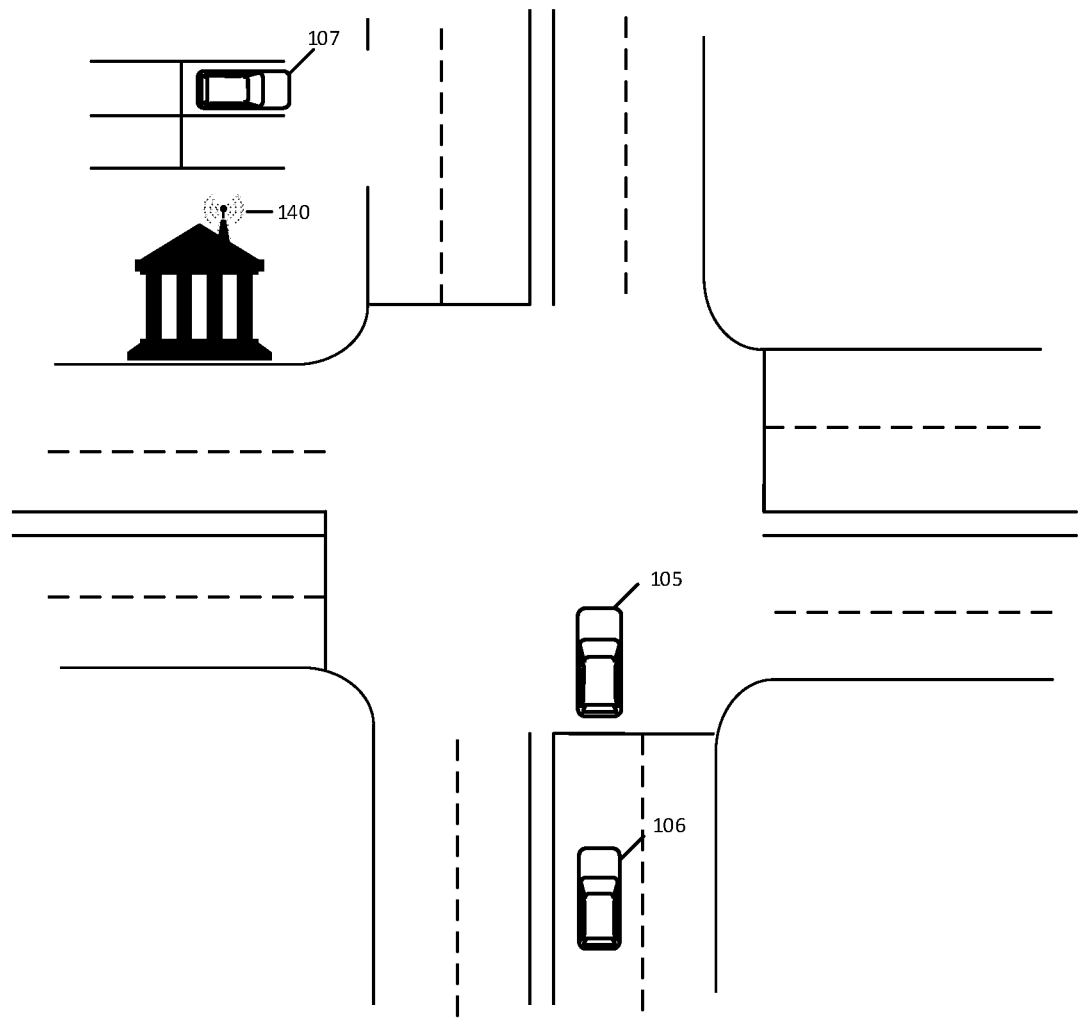
FIG. 2 is a plan view of a host vehicle, a target vehicle, and an assistance vehicle at a location.

FIG. 2 illustrates a target vehicle 106 following a host vehicle 105, and a remote computer 140 specifying a location of an assistance vehicle 107. The remote computer 140 is programmed to determine a location of the assistance vehicle 107, and to transmit location data identifying the location to the vehicle computer 110, e.g., via the network 135. The vehicle computer 110 then operates the host vehicle 105, as described below, to the location to receive threat mitigation assistance. The remote computer 140 may determine the location based on proximity to the host vehicle 105. For example, the remote computer 140 may determine a location of an assistance vehicle 107 (e.g., a location of a police station) in a closest physical proximity (e.g., having a minimum travel time and/or distance) to the host vehicle 105. In this situation, the host vehicle 105 travels to the location of the assistance vehicle 107. As another example, the remote computer 140 may determine a location (e.g., a parking lot) between the host vehicle 105 and an assistance vehicle 107 in a closest proximity to the host vehicle 105. In these circumstances, the remote computer 140 can, for example, instruct an assistance vehicle 107 to travel to the location to provide assistance to the host vehicle 105. That is, the host vehicle 105 and the assistance vehicle 107 each travel to the location specified by the remote computer 140. Location data may be in a conventional form, e.g., geo-coordinates such as latitude and longitude coordinates obtained via a navigation system, as is known, that uses the Global Positioning System (GPS).

The vehicle computer 110 is programmed to receive data from one or more sensors 115. For example, data may include a location of the host vehicle 105, a location of a target vehicle 106, etc. Location data may be in a known form, e.g., geo-coordinates such as latitude and longitude coordinates obtained via a navigation system, as is known, that uses the Global Positioning System (GPS). As another example, data may include at least one of image data or video data of the target vehicle 106. For example, the sensors 115, e.g., cameras, can detect the target vehicle 106 moving relative to the host vehicle 105 and can collect images and/or video of the target vehicle 106. Image data is digital image data, e.g., comprising pixels with intensity and color values, that can be acquired by camera sensors 115. Video data is a plurality of images in substantially equal periods of time, e.g., 10 images per second, and arranged in a sequence. Further examples of data can include measurements of vehicle systems and components 125, e.g., a host vehicle 105 velocity, a host vehicle 105 trajectory, a target vehicle 106 velocity, a target vehicle 106 trajectory, etc.

The vehicle computer 110 can determine a target vehicle 106 is following a host vehicle 105. In the present context, "following" means the trajectory of the target vehicle 106 is within one or more thresholds (e.g., speed, number of lane changes, number of turns, acceleration, deceleration, etc.) of the trajectory of the host vehicle 105 for a predetermined time, e.g., 5 minutes, 10 minutes, etc. The predetermined time may be determined based on empirical testing of user driving habits (e.g., velocity changes, distance maintained between vehicles, route selection, number of lane changes, etc.) under certain conditions such as time of day, weather, operating in construction zones, etc.

To determine whether a target vehicle 106 is following a host vehicle 105, the vehicle computer 110 can determine a following risk assessment for the target vehicle 106 based on sensor 115 data. As used herein, a "following risk assessment" is a number, typically a scalar value between 0 and 1 or a percentage, that the vehicle computer can use to determine whether a specific target vehicle 106 is following the host vehicle 105. The vehicle computer 110 can determine the following risk assessment based on the trajectory of the target vehicle 106 relative to the host vehicle 105. Specifically, the vehicle computer 110 may determine a velocity risk assessment VRA, a lane risk assessment LRA, a path risk assessment PRA, and a distance risk assessment DRA for the target vehicle 106, and based on the risk assessments VRA, LRA, PRA, DRA, which may be combined into the following risk assessment FRA, actuate vehicle components 125.

The VRA is a measure of the relative velocities of the target vehicle 106 and the host vehicle 105. The vehicle computer 110 can compare the velocities of the host vehicle 105 and the target vehicle 106 to determine whether the velocity of the target vehicle 106 adapts to the velocity of the host vehicle 105. That is, the vehicle computer 110 can determine whether the target vehicle 106 velocity changes based on changes of the host vehicle 105 velocity to substantially match the host vehicle 105 velocity, e.g., to maintain a distance between the target vehicle 106 and the host vehicle 105. Said differently, the vehicle computer 110 can determine whether the target vehicle 106 velocity remains within, e.g., 5% of the host vehicle 105 velocity. The vehicle computer 110 can determine the velocities of the vehicles 105, 106 based on sensor 115 data. For example, the vehicle computer 110 can receive data indicating the velocity of the host vehicle 105, e.g., from a GPS sensor, and data indicating the velocity of the target vehicle 106, e.g., from a radar sensor. The vehicle computer 110 can receive sensor 115 data indicating the respective velocities of the vehicles 105, 106 at specified time intervals, e.g., 0.01 seconds, 0.1 seconds, 1 second, 1 minute, etc. The VRA can be a function of the velocities of the vehicles 105, 106 during the predetermined time. As one example, the VRA can a ratio of an average target vehicle 106 velocity $V_t$ to an average host vehicle 105 velocity $V_h$ as determined during the predetermined time, as shown in Equation 1 below.

$$VRA = \frac{V_t}{V_h} \qquad \text{Equation 1}$$

That is, the vehicle computer 110 can determine the average velocities Vt, Vh of the vehicles 105, 106, e.g., based on the number of specified time intervals that occur during the predetermined time. As another example, the VRA can be a function, e.g., a weighted sum, a weighted product, etc., of the ratios of the target vehicle 106 velocity to the host vehicle 105 velocity as determined at sequential time intervals. In other words, the VRA can be a function of the instantaneous velocities of the vehicles 105, 106 as determined at the specified time intervals. As yet another example, the VRA can be a binary value, e.g., 0 or 1. For example, if the target vehicle 106 velocity remains within a threshold velocity, e.g., 5%, of the host vehicle 105 velocity for the predetermined time, or a portion thereof, then the vehicle computer 110 can set the VRA value to 1. If the target vehicle 106 velocity is outside the threshold velocity for the predetermined time or a portion thereof, then the vehicle computer 110 can set the VRA value to 0.

The LRA is a measure of the number of lane selections of the target vehicle 106 that match a lane selection of the host vehicle 105 during the predetermined time. The vehicle computer 110 can compare the lane selections of the target vehicle 106 and the host vehicle 105 to determine whether the target vehicle 106 is changing lanes to remain in the same lane as the host vehicle 105. A lane selection is movement of a vehicle from one lane on a road to another lane on the same road. The vehicle computer 110 can receive data indicating the position of the target vehicle 106 relative to the host vehicle 105, e.g., from a LIDAR sensor. Based on the position data, the vehicle computer 110 can determine the lane selection of the target vehicle 106 (e.g., the target vehicle 106 is in the same lane when directly behind the host vehicle 105). The vehicle computer 110 can determine whether a lane selection of the target vehicle 106 matches a lane selection of the host vehicle 105. For example, the vehicle computer 110 can determine the lane selection of the target vehicle matches a lane selection of the host vehicle 105 if the target vehicle 106 makes the same lane selection as the host vehicle 105 from one lane to another lane (e.g., within a specified time, e.g., 5 seconds, after the host vehicle 105 lane selection). The vehicle computer 110 can determine whether the target vehicle 106 performs a predetermined number of lane selections, e.g., two or more, that match the lane selections of the host vehicle 105. That is, the vehicle computer 110 can determine whether the lane selections of the target vehicle 106 correspond to, e.g., two or more, lane selections of the host vehicle 105. The predetermined number of lane selections may be determined based on empirical testing of user driving habits (e.g., velocity changes, distance maintained between vehicles, route selection, number of lane changes, etc.) under certain conditions such as time of day, weather, operating in construction zones, etc.

The LRA can, for example, be a ratio of the number of lane selections $L_t$ of the target vehicle 106 to the number of lane selections $L_h$ of the host vehicle 105 as determined during the predetermined time, as shown in Equation 2 below.

$$LRA = \frac{L_t}{L_h} \qquad \text{Equation 2}$$

If the target vehicle 106 make more lane selections during the predetermined time than the host vehicle 105 or the number of lane selections is below the predetermined number of lane selections, then the vehicle computer 110 can set the LRA value to 0. As another example, the LRA can be a binary value, e.g., 0 or 1. For example, if the number of lane selections of the target vehicle 106 matching lane selections of the host vehicle 105 is equal to or exceeds the predetermined number of lane selections, then the vehicle computer 110 can set the LRA value to 1. If the number of lane selections of the target vehicle 106 matching lane selections of the host vehicle 105 is below the predetermined number of lane selections, then the vehicle computer 110 can set the LRA value to 0.

The PRA can be a measure of a number of turns of the target vehicle 106 that match a turn of the host vehicle 105 during the predetermined time. The vehicle computer 110 can compare the path selections of the host vehicle 105 and the target vehicle 106 to determine whether the target vehicle 106 is turning to remain on the same road as the host vehicle 105. A path selection is a change in a direction of travel, e.g., a turn from one road onto another road, of a vehicle. The vehicle computer 110 can receive data, e.g., from an image sensor, identifying the target vehicle 106 making a turn from one road to another road. The vehicle computer 110 can determine whether a path selection, e.g., a turn, of the target vehicle 106 matches a path selection, e.g., a turn, of the host vehicle 105. For example, the vehicle computer 110 can determine a path selection of the target vehicle 106 matches a path selection of the host vehicle 105 if the target vehicle 106 makes a same turn as the host vehicle 105 from one road to another road. The vehicle computer 110 can determine whether the target vehicle 106 performs a predetermined number of turns, e.g., two or more, that match turns of the host vehicle 105. That is, the vehicle computer 110 can determine whether the turns of the target vehicle 106 correspond to, e.g., two or more, turns of the host vehicle 105. The predetermined number of turns may be determined based on empirical testing of user driving habits (e.g., velocity changes, distance maintained between vehicles, route selection, number of lane changes, etc.) under certain conditions such as time of day, weather, operating in construction zones, etc.

The PRA can, for example, be a ratio of the number of path selections $P_t$ of the target vehicle 106 to the number of path selections $P_h$ of the host vehicle 105 as determined during the predetermined time, as shown in Equation 3 below.

$$PRA = \frac{P_t}{P_h} \qquad \text{Equation 3}$$

If the target vehicle 106 make more path selections during the predetermined time than the host vehicle 105 or the number of turns is below the predetermined number of turns, then the vehicle computer 110 can set the PRA value to 0. As another example, the PRA can be a be a binary value, e.g., 0 or 1. For example, if the number of turns of the target vehicle 106 matching turns of the host vehicle 105 is equal to or exceeds the predetermined number of turns, then the vehicle computer 110 can set the PRA value to 1. If the number of turns of the target vehicle 106 matching turns of the host vehicle 105 is below the predetermined number of turns, then the vehicle computer 110 can set the PRA value to 0.

The DRA is a measure of a linear distance between the target vehicle 106 and the host vehicle 105. The vehicle computer 110 can determine a distance between the target vehicle 106 and the host vehicle 105, e.g., based on sensor 115 data. The vehicle computer 110 can receive sensor 115 data indicating the distance between the vehicles 105, 106 at specified time intervals, e.g., 0.01 seconds, 0.1 seconds, 1 second, 1 minute, etc. The vehicle computer 110 may determine the DRA based on the distance between the target vehicle 106 and the host vehicle 105. For example, the vehicle computer 110 can compare the distance between the vehicles 105, 106 to a threshold. The threshold is a minimum distance between the vehicles 105, 106 that the vehicle computer 110 can determine the target vehicle 106 is following the host vehicle 105. The threshold may be determined by empirical testing of user driving habits (e.g., velocity changes, distance maintained between vehicles, route selection, number of lane changes, etc.) under certain conditions such as time of day, weather, operating in construction zones, etc.

The DRA can be a function of the distance during the predetermined time. As one example, the DRA can be a ratio of the distance threshold $D_t$ to an average distance $D_a$ between the target vehicle 106 and the host vehicle 105 as determined during the predetermined time, as shown in Equation 4 below.

$$DRA = \frac{D_t}{D_a} \quad \text{Equation 4}$$

As another example, the DRA can be a function, e.g., a weighted sum, a weighted product, etc., of the ratios of the distance threshold $D_t$ to the distance between the vehicles 105, 106 as determined at sequential time intervals. In other words, the DRA can be a function of the instantaneous distance between the vehicles 105, 106 as determined at the specified time intervals If the distance between the target vehicle 106 and the host vehicle 105 is less than the distance threshold, then the vehicle computer 110 can set the value of the DRA to 1. As yet another example, the DRA can be a binary value, e.g., 0 or 1. For example, if the distance between the vehicle 105, 106 remains within the threshold distance for the predetermined time, or a portion thereof, then the vehicle computer 110 can set the DRA value to 1. If the distance between the vehicles 105, 106 is outside the threshold distance for the predetermined time, or a portion thereof, then the vehicle computer 110 can set the DRA value to 0.

The vehicle computer 110 can determine the following risk assessment FRA based on the relative trajectories of the target vehicle 106 and the host vehicle 105. That is, based on the velocity, lane selection, path selection, and position of the host vehicle 105 and the target vehicle 106, the vehicle computer 110 can determine the following risk assessment FRA of the target vehicle 106. For example, the vehicle computer 110 can determine the following risk assessment FRA based on a function, e.g., a weighted product, an average, etc., of the VRA, LRA, PRA, and DRA. That is, the vehicle computer 110 determines the VRA, LRA, PRA, and DRA to produce a respective overall following risk assessment FRA for the target vehicle 106. As one example, the FRA can be a weighted sum of the VRA, LRA, PRA, and DRA, as shown below in Equation 5. In such an example, the VRA, LRA, PRA, and DRA may each be determined according to the respective Equations above.

$$FRA = (w_1 * VRA) + (w_2 * LRA) + (w_3 * PRA) + (w_4 * DRA) \quad \text{Equation 5}$$

The weights $w_1$, $w_2$, $w_3$, $w_4$ may have a same or different value, e.g., between 0 and 1. For example, the weights $w_1$, $w_2$, $w_3$, $w_4$ may be predetermined based on empirical testing of user driving habits (e.g., velocity changes, distance maintained between vehicles, route selection, number of lane changes, etc.) under certain conditions such as time of day, weather, operating in construction zones, etc. Alternatively, the weights $w_1$, $w_2$, $w_3$, $w_4$ may vary, e.g., based on the trajectories of the vehicles 105, 106. In these circumstances, the weight $w_4$ may, for example, be inversely related to the distance between the vehicles 105, 106. That is, as the distance between the vehicle 105, 106 increases, the value of weight $w_4$ may decrease (and the value of the weights $w_1$, $w_2$, $w_3$ may increase), and as the distance between the vehicles 105, 106 decreases, the value of weight $w_4$ may increase (and the value of the weights $w_1$, $w_2$, $w_3$ may decrease).

As another example, the vehicle computer 110 may obtain the following risk assessment FRA as an output from a machine learning program. In this situation, the vehicle computer 110 can input data, e.g., image data, indicating the trajectory of the target vehicle 106 relative to the host vehicle 105 to a machine learning program to predict a following risk assessment FRA of the target vehicle 106. The machine learning program can be a convolutional neural network programmed to accept images as input and output a following risk assessment FRA. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential following risk assessment FRA of the target vehicle 106, and the final output is the following risk assessment FRA of the target vehicle 106 with the highest score. The machine learning program may, for example, be on the vehicle computer 110. Alternatively, the machine learning program may be on the remote computer 140. In this situation, the remote computer 140 may determine the following risk assessment FRA and transmit data indicating the following risk assessment to the vehicle computer 110.

The vehicle computer 110 determines the target vehicle 106 is following the host vehicle 105 based on the following risk assessment FRA, e.g., as determined by Equation 5 above, exceeding a threshold. The threshold is a scalar value between 0 and 1 indicating a likelihood that the target vehicle 106 is following the host vehicle 105, e.g., 0.7. The threshold can be determined based on, e.g., empirical testing of user driving habits (e.g., velocity changes, distance maintained between vehicles, route selection, number of lane changes, etc.) under certain conditions such as time of day, weather, operating in construction zones, etc. The vehicle computer 110, for example, compares the following risk assessment FRA to the threshold, e.g., stored in the memory of the vehicle computer 110, and determines the target vehicle 106 is following the host vehicle 105 when the following risk assessment FRA is greater than the threshold, e.g., 0.7.

The vehicle computer 110 is programmed to transmit data identifying the target vehicle 106 to the remote computer 140 based on the following risk assessment FRA exceeding the threshold, i.e., determining the target vehicle 106 is following the host vehicle 105. In the case that the following risk assessment FRA, e.g., as determined by Equation 5 above, is above the threshold, the vehicle computer 110 transmits image data and/or video data of the target vehicle 106 to the remote computer 140. The vehicle computer 110 can, for example, identify the target vehicle 106 based on the image data and/or the video data. In these circumstances, the vehicle computer 110 can analyze the image data and/or video data to identify the target vehicle 106 by, e.g., a license plate number, a vehicle identification (VIN) number, a make, model, and color of the target vehicle 106, etc. The vehicle computer 110 can then transmit data identifying the target vehicle 106 to the remote computer 140, e.g., in a same or different transmission as the image data and/or video data. Further, the remote computer 140 can then transmit data identifying the target vehicle 106 to the assistance vehicle 107. Alternatively, the remote computer 140 can analyze the image data and/or video data of the target vehicle 106 to identify the target vehicle 106.

The vehicle computer 110 is programmed to actuate one or more vehicle components 125 based on the following risk assessment exceeding the threshold, i.e., determining the target vehicle 106 is following the host vehicle 105. Specifically, the vehicle computer 110 is programmed to actuate the vehicle components 125, e.g., a propulsion component 125, a steering component 125, a braking component 125, etc., to operate the host vehicle 105 to the location specified by the remote computer 140, e.g., a police station. The vehicle computer 110 may include a navigation system that determines the route to the specified location. The vehicle computer 110 then actuates the vehicle components 125 to operate the host vehicle 105 along the route. Alternatively, the remote computer 140 may determine the route to the specified location and transmit the route to the vehicle computer 110.

Further, the vehicle computer 110 may be programmed to output an alert identifying the target vehicle 106 based on the following risk assessment exceeding the threshold, i.e., determining the target vehicle 106 is following the host vehicle 105. For example, the vehicle computer 110 can actuate one or more vehicle components 125, e.g., speakers, a display, etc., to output the alert to the user of the host vehicle 105 when the following risk assessment exceeds the threshold. The vehicle computer 110 may be programmed to output at least one of an audio, a visual, or a haptic alert. Additionally, the alert may notify the user that the vehicle computer 110 will operate the host vehicle 105 to the specified location, e.g., a police station.

Figure 3:
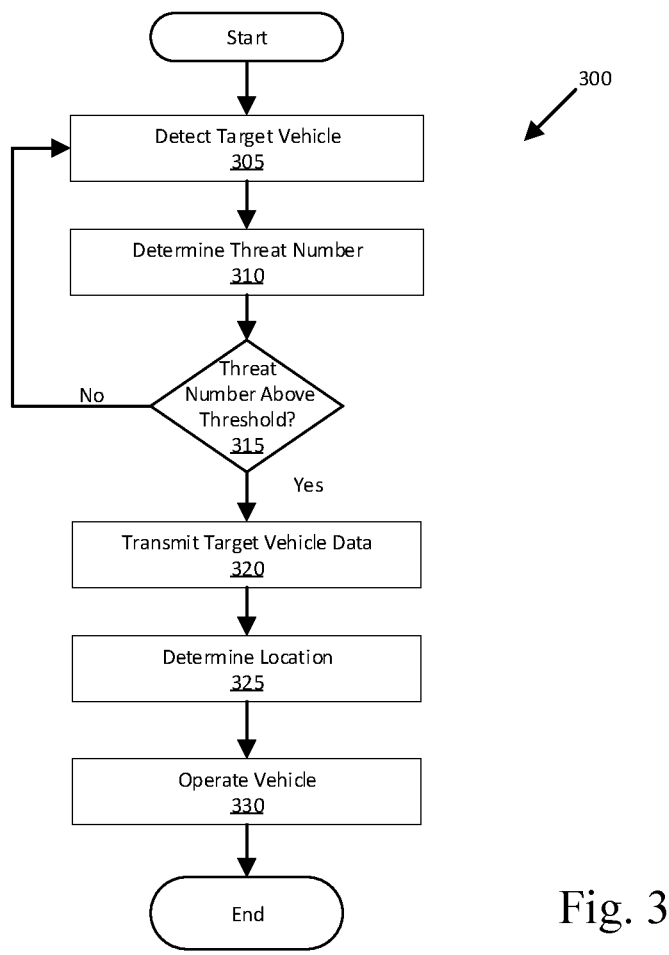
FIG. 3 is a flow chart of an exemplary process to detect and respond to a target vehicle following a host vehicle.

FIG. 3 illustrates a process 300 that can be implemented in the vehicle computer 110 to detect and respond to a target vehicle 106 following a host vehicle 105. The process 300 starts in a block 305.

In the block 305, the vehicle computer 110 detects a target vehicle 106 operating nearby. For example, the vehicle computer 110 can receive sensor 115 data, e.g., via the vehicle network, from one or more sensors 115 detecting the target vehicle 106, e.g., a trajectory of the target vehicle 106. The process 300 continues in a block 310.

In the block 310, the vehicle computer 110 determines the following risk assessment FRA of the target vehicle 106. As described above, the vehicle computer 110 can use the sensor 115 data to determine a following risk assessment FRA of the target vehicle 106 of whether the target vehicle 106 is following the host vehicle 105. The vehicle computer 110 can determine the following risk assessment FRA based on comparing the relative trajectories of the vehicles 105, 106. For example, the vehicle computer 110 can determine the following risk assessment FRA based on the velocity risk assessment VRA, the lane risk assessment LRA, the path risk assessment PRA, and the distance risk assessment DRA, as described above. The process 300 continues in a block 315.

In the block 315, the vehicle computer 110 determines whether the following risk assessment FRA is above a threshold. As described above, the threshold can be a value determined based on a likelihood that the target vehicle 106 following the host vehicle 105. In the case the following risk assessment FRA exceeds the threshold, the vehicle computer 110 determines the target vehicle 106 is following the host vehicle 105. In the case the following risk assessment FRA does not exceed the threshold, the vehicle computer 110 determines the target vehicle 106 is not following the host vehicle 105. When the vehicle computer 110 determines the target vehicle 106 is following the host vehicle 105, the process 300 continues in a block 320. Otherwise, the process 300 returns to the block 305.

In the block 320, the vehicle computer 110 transmits data identifying the target vehicle 106 to the remote computer 140. For example, the vehicle computer 110 transmits sensor 115 data, e.g., image data and/or video data, of the target vehicle 106 to the remote computer 140, e.g., via the network 135. The vehicle computer 110 can analyze the sensor 115 data to identify the target vehicle 106 based on, e.g., a VIN, a license plate number, etc. In these circumstances, the vehicle computer 110 can transmit data identifying the target vehicle 106 to the remote computer 140, e.g., in a same or different transmission as the sensor 115 data. Alternatively, the remote computer 140 can analyze the sensor 115 data to identify the target vehicle 106. The process 300 continues in a block 325.

In the block 325, the remote computer 140 determines a location and transmits location data to the vehicle computer 110. The remote computer 140 can determine the location based on, e.g., an assistance vehicle 107 location. For example, the remote computer 140 can determine the location of the assistance vehicle 107 in closest proximity to the host vehicle 105, as described above. The location can be, e.g., the location of the assistance vehicle 107. Alternatively, the location can be a location between the current locations of the host vehicle 105 and the assistance vehicle 107. The remote computer 140 can then transmit the location data to the vehicle computer 110 and/or the assistance vehicle 107. The assistance vehicle 107 can provide threat mitigation assistance to the host vehicle 105 at the location specified by the remote computer 140. Further, the remote computer 140 can transmit data identifying the target vehicle 106 to the assistance vehicle 107. The process 300 continues in a block 330.

In the block 330, the vehicle computer 110 operates the host vehicle 105 to the location specified by the remote computer 140. For example, the vehicle computer 110 can be programmed to actuate one or more vehicle components 125, e.g., a propulsion component, a brake component, a steering component, etc., to operate the host vehicle 105 to the location. The vehicle computer 110 can determine a route based on, e.g., shortest travel time, to the location specified by the remote computer 140. Alternatively, the remote computer 140 can determine a route from the host vehicle's 105 location to the location specified by the remote computer 140. In this situation, the remote computer 140 can transmit the route to the vehicle computer 110, e.g., in a same or different transmission as the location data. Upon the host vehicle 105 arriving at the location, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    based on host vehicle sensor data, determining host vehicle velocities and target vehicle velocities, at respective times within a predefined time interval, and then determining a velocity risk assessment based on comparing the host vehicle velocities and the target vehicle velocities;
    based on the host vehicle sensor data, determining host vehicle paths and target vehicle paths within the predefined time interval, and determining a path risk assessment based on a ratio of (1) a number of target vehicle paths that match the host vehicle paths to (2) a number of the host vehicle paths;
    based on the host vehicle sensor data, determining host vehicle lane selections and target vehicle lane selections within the predefined time interval, and determine a lane risk assessment based on a ratio of (1) a number of target vehicle lane selections that match the host vehicle lane selections to (2) a number of the host vehicle lane selections;
    determining a following risk assessment for the target vehicle relative to the host vehicle based on the velocity risk assessment, the path risk assessment, and the lane risk assessment;

determining the target vehicle is following the host vehicle based on the following risk assessment being above a threshold;

then transmitting data identifying the target vehicle to a remote computer and actuating vehicle components to operate the host vehicle to a location specified by the remote computer; and transmitting, from the remote computer, a message to an assistance vehicle in response to receiving the data identifying the target vehicle, the message instructing the assistance vehicle to operate to the location.

2. The method of claim 1, further comprising detecting a distance between the host vehicle and the target vehicle and determining the following risk assessment further based on the distance.

3. The method of claim 1, wherein the data identifying the target vehicle includes at least one of image data or video data of the target vehicle.

4. The method of claim 1, wherein the remote computer is one of a portable device, a vehicle computer, or a computer associated with the location.

5. The method of claim 1, wherein determining the following risk assessment includes obtaining the following risk assessment as output from a machine learning program.

6. The method of claim 1, further comprising outputting an alert identifying the target vehicle to the host vehicle based on the following risk assessment being above the threshold.

7. The method of claim 1, wherein comparing a velocity includes determining whether a velocity of the target vehicle adapts to a velocity of the host vehicle.

8. The method of claim 1, wherein comparing a lane selection includes determining whether lane selections of the target vehicle correspond to two or more lane selections of the host vehicle.

9. A system, comprising a computer including a processor and a memory, the memory storing instructions executable by the processor to:

based on host vehicle sensor data, determine host vehicle velocities and target vehicle velocities, at respective times within a predefined time interval, and then determine a velocity risk assessment based on comparing the host vehicle velocities and the target vehicle velocities;

based on the host vehicle sensor data, determine host vehicle paths and target vehicle paths within the predefined time interval, and determine a path risk assessment based on a ratio of (1) a number of target vehicle paths that match the host vehicle paths to (2) a number of the host vehicle paths;

based on the host vehicle sensor data, determine host vehicle lane selections and target vehicle lane selections within the predefined time interval, and determine a lane risk assessment based on a ratio of (1) a number of target vehicle lane selections that match the host vehicle lane selections to (2) a number of the host vehicle lane selections;

determine a following risk assessment of the target vehicle relative to the host vehicle based on the velocity risk assessment, the path risk assessment, and the lane risk assessment;

determine the target vehicle is following the host vehicle based on the following risk assessment being above a threshold; and then transmit data identifying the target vehicle to a remote computer and actuate vehicle components to operate the host vehicle to a location specified by the remote computer; and the remote computer including a second processor and a second memory, the second memory storing instructions executable by the second processor to transmit a message to an assistance vehicle in response to receiving the data identifying the target vehicle, the message instructing the assistance vehicle to operate to the location.

10. The system of claim 9, wherein the instructions further include instructions to detect a distance between the host vehicle and the target vehicle and to determine the following risk assessment further based on the distance.

11. The system of claim 9, wherein the data identifying the target vehicle includes at least one of image data and video data of the target vehicle.

12. The system of claim 9, wherein the remote computer is one of a portable device, a vehicle computer, or a computer associated with the location.

13. The system of claim 9, wherein determining the following risk assessment includes obtaining the following risk assessment as output from a machine learning program.

14. The system of claim 9, wherein the instructions further include instructions to output an alert identifying the target vehicle to the host vehicle based on the following risk assessment being above the threshold.

15. The system of claim 9, wherein comparing a velocity includes determining whether a velocity of the target vehicle adapts to a velocity of the host vehicle.

16. The system of claim 9, wherein comparing a lane selection includes determining whether lane selections of the target vehicle correspond to two or more lane selections of the host vehicle.

17. A system, comprising a computer including a processor and a memory, the memory storing instructions executable by the processor to:

based on host vehicle sensor data, determining host vehicle velocities and target vehicle velocities, at respective times within a predefined time interval, and then determining a velocity risk assessment based on comparing the host vehicle velocities and the target vehicle velocities;

based on the host vehicle sensor data, determining host vehicle paths and target vehicle paths within the predefined time interval, and determining a path risk assessment based on a ratio of (1) a number of target vehicle paths that match the host vehicle paths to (2) a number of the host vehicle paths;

based on the host vehicle sensor data, determining host vehicle lane selections and target vehicle lane selections within the predefined time interval, and determine a lane risk assessment based on a ratio of (1) a number of target vehicle lane selections that match the host vehicle lane selections to (2) a number of the host vehicle lane selections;

determine a following risk assessment of the target vehicle relative to the host vehicle based on the velocity risk assessment, the path risk assessment, and the lane risk assessment;

determine the target vehicle is following the host vehicle based on the following risk assessment being above a threshold; and then transmit data identifying the target vehicle to a remote computer and actuate vehicle components to operate the host vehicle to a location specified by the remote computer.

* * * * *